US009640311B1

United States Patent
Kordik et al.

(10) Patent No.: US 9,640,311 B1
(45) Date of Patent: May 2, 2017

(54) SYSTEMS AND METHODS FOR SOLENOID STATE DETERMINATION

(71) Applicant: Goodrich Corporation, Charlotte, NC (US)

(72) Inventors: Michael Kordik, Dayton, OH (US); Paul Summers, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/006,351

(22) Filed: Jan. 26, 2016

(51) Int. Cl.
H01F 7/06 (2006.01)
B60T 8/17 (2006.01)

(52) U.S. Cl.
CPC ............ *H01F 7/064* (2013.01); *B60T 8/1703* (2013.01)

(58) Field of Classification Search
CPC ....... H01F 7/064; B60T 8/1703; G01M 17/00
See application file for complete search history.

(56) References Cited

U.S. PATENT DOCUMENTS

| | | | |
|---|---|---|---|
| 6,300,733 B1 | 10/2001 | Bergstrom | |
| 6,322,166 B1 | 11/2001 | Furuya et al. | |
| 7,396,089 B2 * | 7/2008 | Bennett | B60T 13/268 303/119.2 |
| 8,589,016 B2 * | 11/2013 | Bange | H02M 3/156 375/238 |
| 8,655,567 B2 * | 2/2014 | Watanabe | B60T 8/36 303/155 |
| 9,073,525 B2 * | 7/2015 | Fukasawa | B60T 8/36 |
| 9,352,730 B2 * | 5/2016 | Nimura | B60T 8/36 |
| 2002/0179571 A1 * | 12/2002 | Rhein | H01H 33/6662 218/7 |
| 2015/0314767 A1 * | 11/2015 | Miyazaki | B60T 8/4081 303/10 |

FOREIGN PATENT DOCUMENTS

JP 2011131706 7/2011

* cited by examiner

*Primary Examiner* — Adam Tissot
*Assistant Examiner* — Alex C Dunn
(74) *Attorney, Agent, or Firm* — Snell & Wilmer L.L.P.

(57) ABSTRACT

Systems and methods for controlling a solenoid may include measuring a current flowing through a solenoid, and detecting characteristics of the current flowing through the solenoid. The characteristics may be used to determine a state of the solenoid. Characteristics of the current comprise may include local extrema of the current, rate of change of the current, and/or discrete values of the current. The solenoid may comprise a bistable device.

13 Claims, 5 Drawing Sheets

SYSTEMS AND METHODS FOR SOLENOID STATE DETERMINATION

FIELD

The present disclosure relates to aircraft braking systems. In particular, the disclosure relates to electronic solenoids.

BACKGROUND

Solenoids are used in many applications, such as locking systems on electric brake actuators. They are often devices with two discrete positions, that stay in each state even with power removed, referred to as bistable devices. A solenoid may change state in response to electrical energy applied to the device. Some aircraft brakes use solenoids to lock brake actuators in place, for example. Such a solenoid may act as a parking brake. Solenoids may also be used in other applications on aircraft.

In many applications it may be beneficial to know the state of a solenoid. However, in many applications the state of the solenoid may not be available. Adding additional hardware to monitor solenoid state may add to the weight of an aircraft, which in turn may impede aircraft performance.

SUMMARY

According to various embodiments, a method for controlling a solenoid is provided. The method comprises measuring a current flowing through a solenoid, and detecting characteristics of the current flowing through the solenoid. The characteristics may be used to determine a state of the solenoid.

In various embodiments, the method may include exciting the solenoid by turning on an electric signal. Characteristics of the current may include local extrema of the current, rate of change of the current, and/or discrete values of the current. The solenoid may comprise a bistable device. The method may further include identifying a first derivative of the current to detect a solenoid is moving.

According to various embodiments, a brake control system is also provided. The brake control system may include a control unit and a solenoid electronically coupled to the control unit. The control unit may be configured to monitor a current passing through the solenoid and to detect characteristics of the current flowing through the solenoid. The control unit may use the characteristics of the current to determine a state of the solenoid.

In various embodiments, the solenoid may be configured to move in response to the control unit turning on an electric signal. The brake control unit may be configured to turn off the electric signal in response to the characteristics of the current flowing through the solenoid indicating that the solenoid is moving. The solenoid may be a bistable device, for example. The control unit may further comprise a memory and a processor. An electromechanical actuator (EMA) may be mechanically coupled to the solenoid with the solenoid configured to lock the EMA. The brake control system may also include a brake stack with the solenoid configured to lock the EMA applying a force to the brake stack.

According to various embodiments, an article of manufacture is also provided. The article includes a non-transitory, tangible computer readable storage medium having instructions stored thereon that, in response to execution by a processor, cause a brake system to perform operations. The operations may include measuring current flowing through a solenoid, and detecting characteristics of the current flowing through the solenoid. The characteristics may be used to determine a state of the solenoid.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
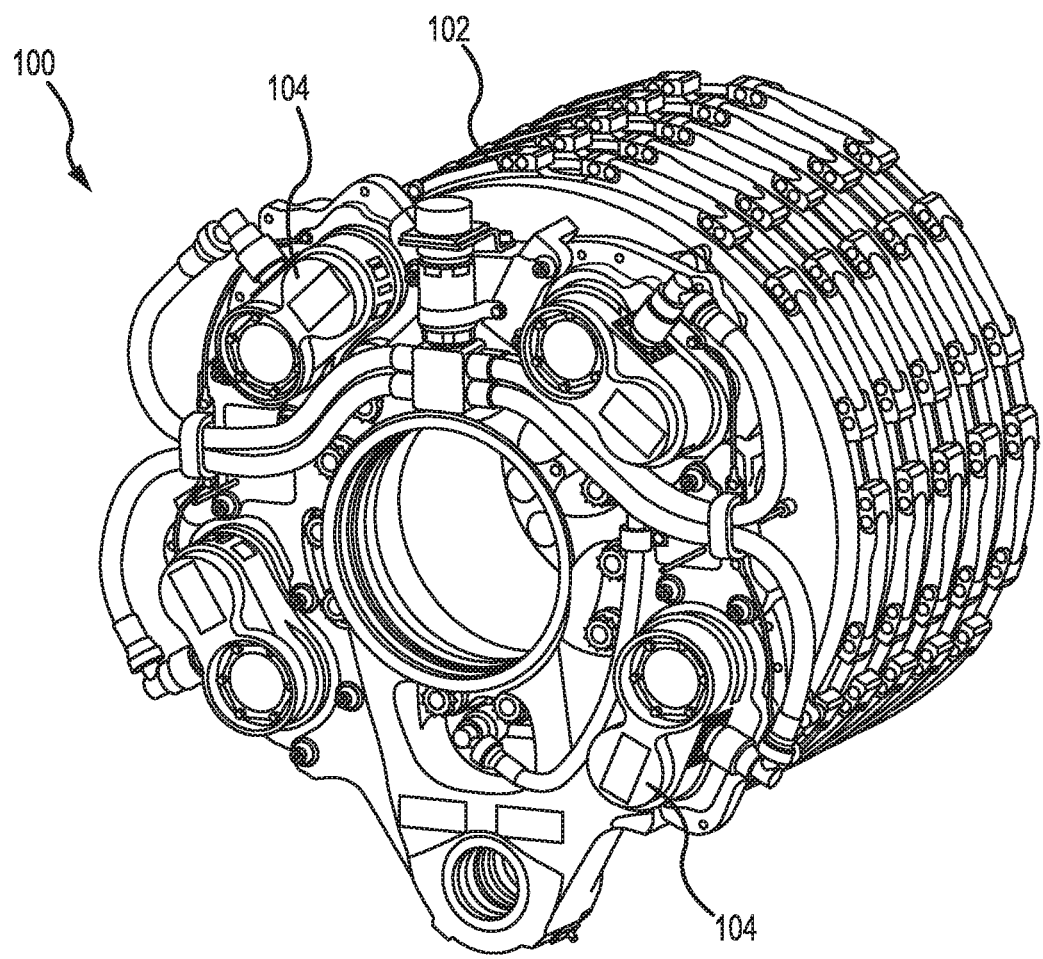
FIG. 1 illustrates a perspective view of an exemplary brake stack having multiple electromechanical brake actuators, in accordance with various embodiments.

Electromechanical actuators (EMA) may be used to stop and slow aircraft by providing compressive force. When parked, the EMA may be locked into a braking position using a solenoid. The solenoid position may be controlled and/or determined using current. The wave form of current passing though the solenoid in response to the solenoid being energized may be used to determine the solenoid position. With reference to FIG. 1, a perspective view of an exemplary brake 100 is shown, in accordance with various embodiments. Brake 100 may comprise a brake stack 102 having a cylindrical geometry. EMA assemblies 104 may be disposed at an end of brake 100. Although brake 100 is illustrated having four EMA assemblies 104, any number of EMA assemblies 104 may be used to apply pressure to brake stack 102. EMA assemblies 104 may each be configured to apply compressive force to brake stack 102 and thereby slow or stop an aircraft. EMA assemblies 104 may include locking mechanisms in the form of solenoids.

Figure 2:
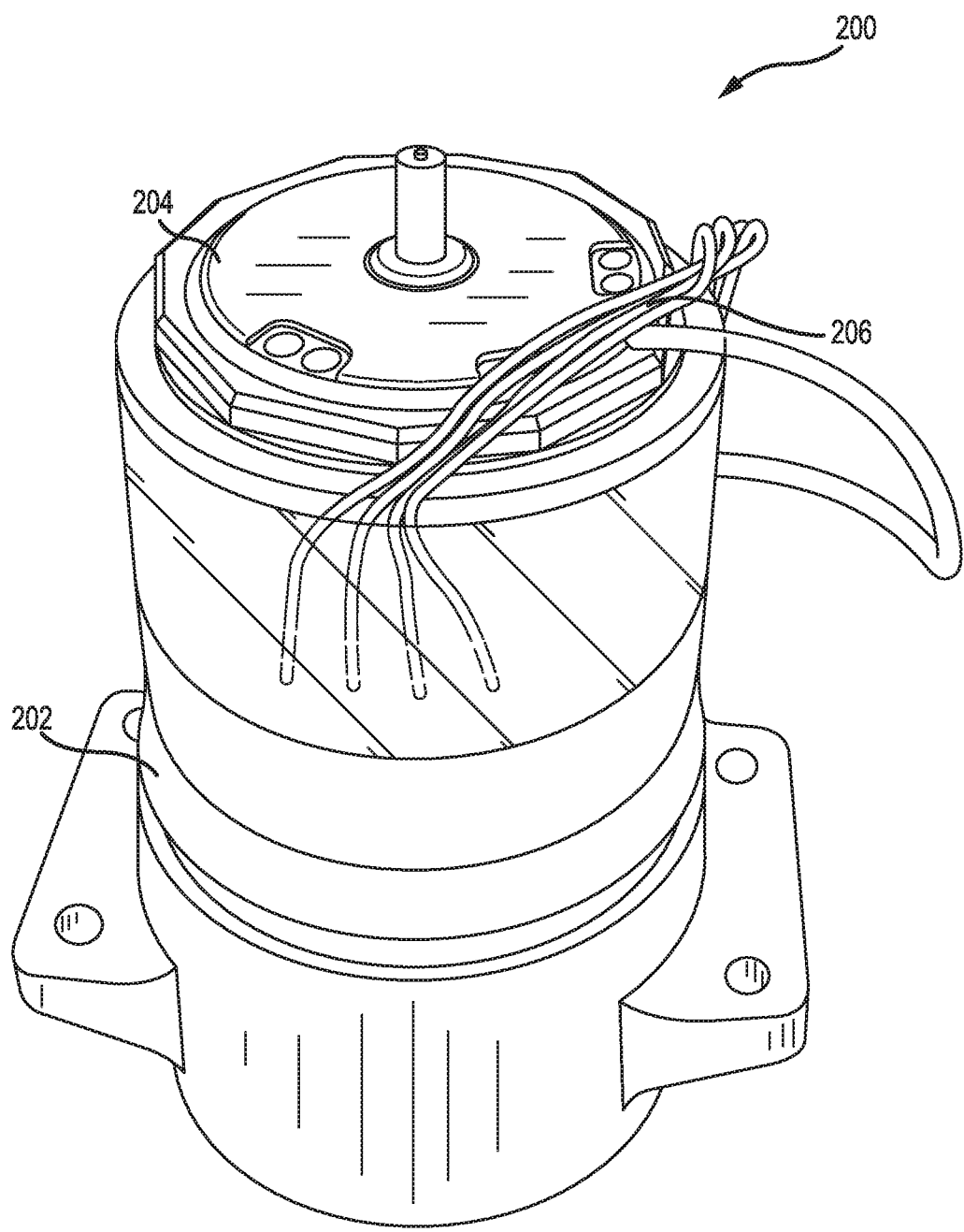
FIG. 2 illustrates a perspective view of an exemplary electromechanical brake actuator having a locking solenoid, in accordance with various embodiments.

With reference to FIG. 2, an exemplary locking EMA assembly 200 is shown, in accordance with various embodiments. Locking EMA assembly 200 may include an EMA 202 configured to apply compressive force to a brake stack. The EMA may actuate towards and away from the brake stack to increase or decrease braking force, respectively. A solenoid 204 may be mechanically coupled to EMA 202 to provide electronic locking and/or unlocking of EMA 202 in braking positions. Solenoid 204 may be a bistable device that locks EMA 202 in one state and allows EMA 104 to spin freely in the second state. Solenoid 204 may move in response to a current provided through one or more wires 206. Although solenoid 204 is illustrated in a braking application for exemplary purposes, the systems and process disclosed herein may be used in any solenoid application. In that regard, solenoid 204 may be any form of solenoid actuator including a bistable solenoid, linear solenoid, rotary solenoid, voice coil, or other form of solenoid.

Figure 3:
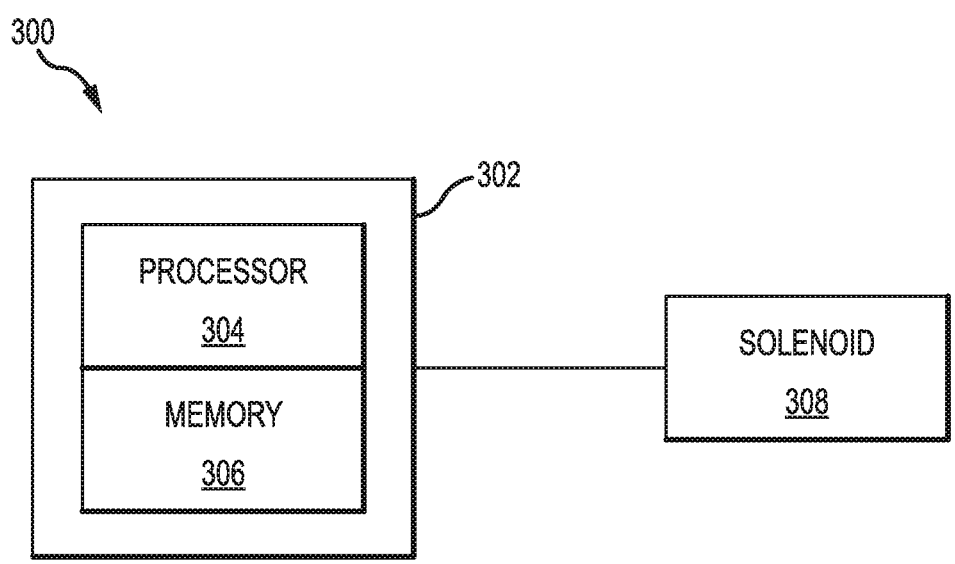
FIG. 3 illustrates a schematic view of a control unit for controlling a solenoid, in accordance with various embodiments.

With reference to FIG. 3, an exemplary solenoid control system 300 for determining a state of a solenoid is shown, in accordance with various embodiments. Control unit 302 may be integrated into an electronic brake actuator controller (EBAC) or other control unit. Control unit 302 may also be implemented as a discrete controller. Control unit 302 may include one or more processors 304 and one or more tangible, non-transitory memories 306 and be capable of implementing logic (as discussed below with reference to FIGS. 4 and 5). Processor 304 can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The processor may thus be configured to implement various logical operations in response to execution of instructions, for example, instructions stored on a non-transitory, tangible, computer-readable medium. Control unit 302 may be in electronic communication with solenoid 308. In that regard, control unit 302 may measure and analyze the electronic signal driving solenoid 308.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. §101.

Figure 4:
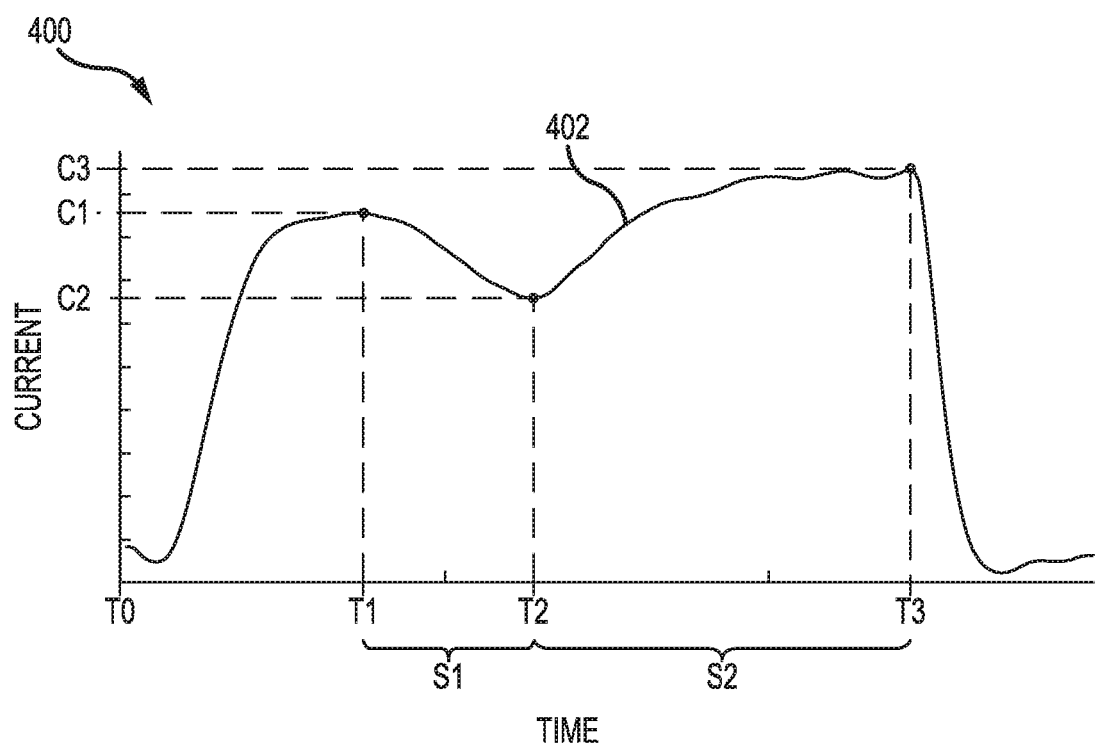
FIG. 4 illustrates an exemplary waveform of the current passing through a bistable solenoid during the switching process, in accordance with various embodiments.

With reference to FIG. 4, an exemplary plot 400 of the current 402 passing through a solenoid to effectuate actuation over time, in accordance with various embodiments. The solenoid through which the current is passing may be any solenoid for any application including the exemplary braking application disclosed above. Plot 400 includes points of interest that correspond to the state of current 402 and the state of the solenoid. For example, plot 400 may be used to identify when the solenoid begins moving, and when the solenoid stops moving based on a power drive signal such as current 402. Plot 400 may also include local extrema and the rate of change of current 402 that may be used to identify the state of the solenoid. Plot 400 may be generated by sampling current 402 at intervals and calculating the values. For example, current 402 may be sampled 1,000 times per second (1 kHz) to determine the current at each sample time as well as the change in current over time (i.e., the slope or first derivative of current).

In various embodiments, current begins passing through the solenoid at time $T_0$. The current passing through the solenoid generally increases until time $T_1$. At time $T_1$, a local maximum in current is present. Current $C_1$ passes through the solenoid at time $T_1$. The solenoid begins moving in response to current $C_1$.

In various embodiments, the solenoid may complete switching at or around time $T_2$. The current $C_2$ passing through the solenoid at time $T_2$ may be a local minimum. Current $C_2$ may also be the next local extrema after $C_1$. In that regard, $C_2$ may be less than $C_1$. The segment of plot 400 spanning from $T_1$ to $T_2$ may be referred to as $S_1$.

In various embodiments, the current generally decreases over segment $S_1$. Using Cartesian coordinates, the slope (i.e., rate of change or derivative) of plot 400 at between two points $(T_x, C_x)$ and $(T_y, C_y)$ may be calculated $C_y-C_x/T_y-T_x$. Thus, the average slope (i.e., the rate of change) of segment S1 may be defined as $C_2-C_1/T_2-T_1$, which may a negative number since $C_1$ is greater than $C_2$. The solenoid may complete its actuation or movement at time $T_2$. The current value may rise after time T2 in response to the solenoid completing its movement or actuation as the coil of the solenoid charges.

In various embodiments, the segment $S_2$ may extend from time $T_2$ to time $T_3$. At time $T_3$, current may have value $C_3$. Segment $S_2$ may generally include increasing current values from $C_2$ to $C_3$. C3 may be greater than $C_1$ and/or $C_2$. The solenoid may be at rest during segment $S_2$.

Figure 5:
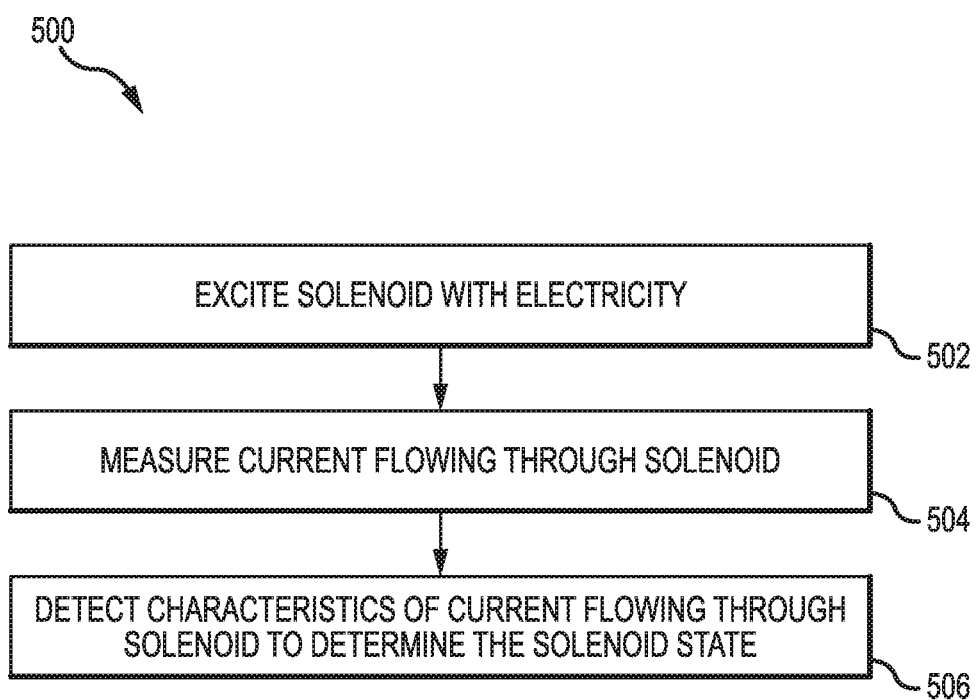
FIG. 5 illustrates an exemplary process for determining the state of a solenoid, in accordance with various embodiments.

With reference to FIG. 5, a process 500 for determining the state of a solenoid (e.g., solenoid 308 of FIG. 3) based on the power drive signal (e.g., current 402 of FIG. 4) passing through the solenoid is shown, in accordance with various embodiments. Process 500 may be conducted by a control unit such as control unit 302 of FIG. 3. Control unit 302 may control the exciting electrical energy delivered to solenoid 308. For example, control unit 302 may control the exciting electrical energy's amplitude, on/off time, and/or polarity. Control unit 302 may control the electricity used to excite solenoid 308 and thereby initiate the movement of solenoid 308 (Block 502). The power drive signal used to determine the state of the solenoid (e.g., a feedback signal from the solenoid) may be an electronic signal such as a voltage signal or a current signal. The characteristics of the signal may be used to determine the state of the solenoid.

In various embodiments, control unit 302 may measure the current flowing through the solenoid in response to the solenoid being activated (Block 504). For example, a current measurement device may be placed in series with the solenoid to measure current through the solenoid. Similarly, voltage may be used to identify solenoid state by placing a voltage measurement device in parallel with the solenoid to measure the voltage change across the solenoid.

In various embodiments, control unit 302 may detect characteristics of the current flowing through the solenoid to determine the solenoid state (Block 506). Characteristics of the current may include the characteristics of plot 400 of current 402 as described above with reference to FIG. 4. Some of the characteristics of plot 400 useful to in determining solenoid state may include local extrema and slopes.

In various embodiments, control unit 302 may identify the time at which solenoid 308 starts moving by detecting point $(T_1, C_1)$ of FIG. 4. Point $(T_1, C_1)$ may be identified by finding local extrema, identifying discrete current values (such as $C_1$), identifying a time (such as $T_1$), identifying the rate of change of the current (i.e., the first derivative or slope of the current), or identifying other characteristics of the power signal driving solenoid 308. The current may be sampled to identify characteristics of the current. Sampling may include measuring the current repeatedly at regular and/or irregular intervals. For example, control unit 302 may measure the current at a frequency of 10, kHz, 1 kHz, 500 Hz, or any desired frequency. Finer granularity (i.e., higher sampling frequency) may be used as the complete switching of solenoid 308 between states may take less than one second.

In various embodiments, local extrema (minimums and maximums where the slope of plot 400 differs in sign on either side) may be located by identifying times where the rate of change of the current (i.e., first derivative of current) is substantially equal to zero and/or determining whether the sign (+/−) of the rate of change of the current changes at that time. Due to the nature of sampling, a precise time at which the rate of change equals zero may be difficult to identify. The solenoid may begin switching at approximately the time where a local maximum occurs (i.e., where the sign of the slope of the current changes from + to −), and the solenoid may complete switching at approximately the time where the local minimum occurs (i.e., where the sign of the slope of the current changes from − to +).

In various embodiments, discrete current and/or time values may be used to identify solenoid state. For example, control unit 302 may detect solenoid 308 beginning to switch by detecting that the current has risen to approximately $C_1$ for the first time since excitation of solenoid 308. Control unit 302 may detect solenoid 308 completing switching by detecting that the current has dropped to $C_2$ after rising to $C_1$.

In various embodiments, control unit 302 may identify slopes over a timespan to determine the state of solenoid 308. For example, control unit 302 may determine that solenoid 308 is in the process of switching by identifying a time period when the slope of the current is approximately equal to the average slope over segment S1 of plot 400 $(C_2-C_1/T_2-T_1)$ Control unit 302 may identify the foregoing characteristics, alone or in conjunction, to determine solenoid state. In addition, other characteristics of current 402 driving solenoid 308 may be suitable for use in determine the state of solenoid 308. Furthermore, the foregoing characteristics of the current signal driving an actuator may be used to identify discrete points of interest with respect to solenoid state.

In various embodiments, the state of a solenoid may thus be determined without additional detection hardware on the solenoid to determine its state. As a result, additional weight may not be added to weight-sensitive installations. Furthermore, the signal may be detected without adding pins or interconnecting wires. Identifying the state of solenoid 308 tends to increase the safety of a system using solenoid 308 by enabling detection that solenoid 308 completed a state change and is in the desired position based on the characteristics of the current. For example, identifying a solenoid state may signify that a parking brake on an aircraft has successfully engaged and/or disengaged.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method for controlling a solenoid, comprising:
measuring a current flowing through the solenoid;
detecting characteristics of the current flowing through the solenoid to determine a state of the solenoid;
applying an electric signal to the solenoid to activate the solenoid; and
ending the electric signal to the solenoid in response to the characteristics of the current flowing through the sole- noid indicating the state of the solenoid, wherein the state of the solenoid indicates that the solenoid has changed position.

2. The method of claim 1, wherein the characteristics of the current comprise at least one of a local extrema of the current, a rate of change of the current, or a discrete value of the current.

3. The method of claim 1, further comprising identifying a first derivative of the current to detect the solenoid is moving.

4. The method of claim 1, wherein the solenoid comprises a bistable device.

5. A brake control system, comprising:
a control unit; and
a solenoid electronically coupled to the control unit,
wherein the control unit is configured to monitor a current passing through the solenoid,
wherein the control unit is configured to detect characteristics of the current flowing through the solenoid to determine a state of the solenoid,
wherein the solenoid is configured to move in response to the control unit turning on an electric signal; and
wherein the state of the solenoid indicates that the solenoid has changed position.

6. The brake control system of claim 5, wherein the solenoid comprises a bistable device.

7. The brake control system of claim 6, wherein the control unit comprises a memory and a processor.

8. The brake control system of claim 6, further comprising an electromechanical actuator (EMA) mechanically coupled to the solenoid, wherein the solenoid is configured to lock the EMA.

9. The brake control system of claim 8, further comprising a brake stack, wherein the solenoid is configured to lock the EMA with the EMA applying a force to the brake stack.

10. An article of manufacture including a non-transitory, tangible computer readable storage medium having instructions stored thereon that, in response to execution by a processor, cause a brake system to perform operations comprising:
measuring a current flowing through a solenoid;
detecting characteristics of the current flowing through the solenoid to determine a state of the solenoid; and
applying an electric signal to the solenoid to activate the solenoid, wherein the state of the solenoid is changing positions.

11. The article of claim 10, wherein the state of the solenoid indicates that the solenoid has changed position.

12. The article of claim 10, wherein the characteristics of the current comprise at least one of a local extrema of the current, a rate of change of the current, or a discrete value of the current.

13. The article of claim 10, wherein the solenoid comprises a bistable device.

* * * * *